US012801143B2

(12) United States Patent
Yamada

(10) Patent No.: US 12,801,143 B2
(45) Date of Patent: Nov. 17, 2026

(54) VEHICLE CONTROL APPARATUS

(71) Applicant: TOYOTA JIDOSHA KABUSHIKI KAISHA, Aichi (JP)

(72) Inventor: Atsuko Yamada, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 34 days.

(21) Appl. No.: 18/983,349

(22) Filed: Dec. 17, 2024

(65) Prior Publication Data

US 2025/0208618 A1 Jun. 26, 2025

(30) Foreign Application Priority Data

Dec. 22, 2023 (JP) ................................ 2023-216917

(51) Int. Cl.
*G05D 1/222* (2024.01)
*G05D 1/224* (2024.01)

(52) U.S. Cl.
CPC ......... *G05D 1/2235* (2024.01); *G05D 1/2242* (2024.01); *G05D 1/2243* (2024.01)

(58) Field of Classification Search
CPC .... G05D 1/222; G05D 1/2235; G05D 1/2242; G05D 1/2243; G06T 19/006; B60K 35/00; B60K 37/06; B60K 2350/1052; B60K 2350/2013; B60K 2350/355; G06F 3/017; G06F 3/04815; G06F 3/04886; G02B 27/017
USPC ........................................................ 701/2, 22
See application file for complete search history.

(56) References Cited

U.S. PATENT DOCUMENTS

| | | | |
|---|---|---|---|
| 8,903,567 B2 | 12/2014 | Morimoto et al. | |
| 10,002,525 B2 * | 6/2018 | Scheerle ................ | G08C 17/02 |
| 10,249,088 B2 * | 4/2019 | Whinnery ............... | G06F 3/017 |
| 10,464,554 B2 | 11/2019 | Okamura et al. | |
| 11,181,901 B2 * | 11/2021 | Pöllny .................... | B60K 28/04 |
| 2019/0302754 A1 | 10/2019 | Tsuruoka | |
| 2020/0218249 A1 | 7/2020 | Sannodo et al. | |
| 2020/0310412 A1 | 10/2020 | Noguchi et al. | |
| 2021/0197772 A1 | 7/2021 | Tsumano | |

FOREIGN PATENT DOCUMENTS

| | | |
|---|---|---|
| JP | 2020-164079 A | 10/2020 |
| JP | 2023-052100 A | 4/2023 |

* cited by examiner

*Primary Examiner* — Andrew Joseph Rudy
(74) *Attorney, Agent, or Firm* — HAUPTMAN HAM, LLP

(57) ABSTRACT

A monitoring apparatus monitors the user while the remote driving control for driving the vehicle in accordance with a command from the user outside the vehicle is being executed. The monitoring apparatus performs a watching notification for urging the user to watch the vehicle when a non-watching condition is satisfied. The non-watching condition is satisfied when a non-watching state in which the user does not watch the vehicle continues for a first predetermined time period or longer.

8 Claims, 4 Drawing Sheets

VEHICLE CONTROL APPARATUS

RELATED APPLICATIONS

The present application claims priority to Japanese Patent Application No. 2023-216917, filed Dec. 22, 2023, the disclosure of which is hereby incorporated by reference herein in its entirety.

TECHNICAL FIELD

The present disclosure relates to a monitoring apparatus configured to monitor a user when a remote driving control for driving a vehicle in accordance with a command from the user outside the vehicle is being executed.

BACKGROUND

Conventionally, there has been known a remote driving control apparatus configured to execute a remote driving control. For example, the remote driving control apparatus described in Patent Document 1 executes the remote driving control based on a command transmitted by a remote operation apparatus operated by a user. The remote operation apparatus transmits a command when a movement of the user's finger on an area where a touch can be detected satisfies a predetermined operation condition.

Patent Document 1: Japanese Patent Application Laid-Open No. 2023-052100

SUMMARY

When the remote driving control apparatus is executing the remote driving control to drive the vehicle, the user needs to monitor the vehicle by actually watching the vehicle. However, the remote driving control apparatus and the remote operation apparatus described in Patent Document 1 do not determine whether or not the user is actually watching the vehicle. Therefore, the remote driving control apparatus and the remote operation apparatus described in Patent Document 1 cannot urge the user who are not actually watching the vehicle to watch the vehicle.

The present disclosure is made to address the above problem. That is, one of objects of the present disclosure is to provide a monitoring apparatus that can urge the user to watch the vehicle when the user is not actually watching the vehicle which is being driven by the remote driving control.

A monitoring apparatus (hereinafter, referred to as the "present disclosure apparatus") monitors a user while a remote driving control for driving a vehicle in accordance with a command from the user outside the vehicle is being executed. The monitoring apparatus is configured to perform a watching notification for urging the user to watch the vehicle ("Yes" at step 415, step 420) when a non-watching condition is satisfied ("Yes" at step 215, step 235, "Yes" at step 240, "No" at step 245, step 250). The non-watching condition is a condition that is satisfied when a non-watching state in which the user does not watch the vehicle continues for a first predetermined time period or longer.

According to the present disclosure apparatus, the watching notification is performed when the non-watching condition is satisfied. Therefore, if the user is not actually watching the vehicle that is being driven by the remote driving control, the present disclosure apparatus can urge the user to watch the vehicle.

DETAILED DESCRIPTION

Figure 1:
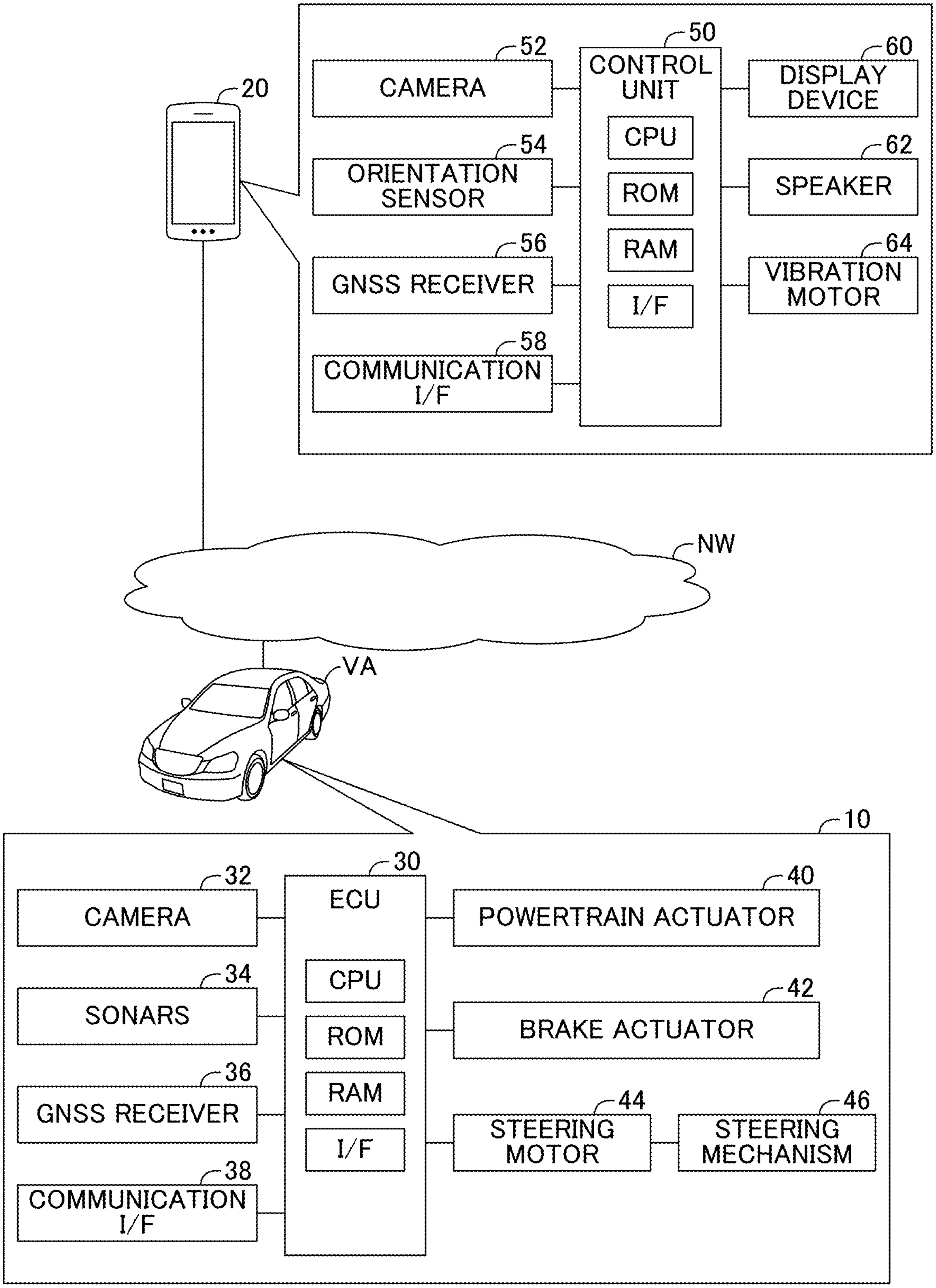
FIG. 1 is a schematic system configuration diagram of a vehicle control system according to an embodiment of the present disclosure.

As shown in FIG. 1, a vehicle control system according to the present embodiment comprises a vehicle control apparatus 10 applied to a vehicle VA and a remote operation apparatus 20. The vehicle control apparatus 10 and the remote operation apparatus 20 are communicatively connected via a network NW.

The vehicle control apparatus 10 comprises components shown in FIG. 1. In this specification, the "ECU 30" is an electronic control unit with a microcomputer as a main part. The ECU 30 is also referred to as a control unit, a controller and a computer. The microcomputer includes a CPU (processor), a ROM, a RAM, and an interface (I/F), etc. Functions realized by the ECU 20 may be realized by multiple ECUs.

A camera 32 acquires image data by capturing a scenery around the vehicle VA. Each of sonars 34 acquires sonar data related to a position of an object around the vehicle VA with respect to the vehicle VA. The ECU 30 acquires the image data from the camera 32 and acquires the sonar data from the sonar 34. The ECU 30 recognizes the object around the vehicle VA based on the image data and the sonar data.

A Global Navigation Satellite System (GNSS) receiver 36 receives signals from multiple satellites and specifies the current position (latitude and longitude) of the vehicle VA based on the received signals. A communication interface (I/F) 38 is an interface for connecting the vehicle control apparatus 10 to the network NW.

A powertrain actuator 40 changes a driving force generated by a drive device (e.g., an internal combustion engine and/or an electric motor). A brake actuator 42 changes a braking force applied to the vehicle VA. A steering motor 44 is incorporated in a steering mechanism 46. The steering mechanism 46 is a mechanism for turning steered wheels in response to an operation of a steering wheel. The steering motor 44 generates an automatic steering torque to change the steered angle of the steered wheels in response to a command from the ECU 30.

The remote operation apparatus 20 is an apparatus that can be operated even when the user is outside the vehicle VA. For example, the remote operation apparatus 20 is a smartphone. The remote operation apparatus 20 comprises components shown in FIG. 1.

A control unit 50 includes a CPU (processor), a ROM, a RAM, and an interface (I/F), etc. A camera 52 is capable of acquiring a face image by capturing the user's face. An orientation sensor 54 detects a direction of a central axis CA (referring to FIG. 3) of the remote operation apparatus 20. A GNSS receiver 56 and a communication I/F 58 are the same as the GNSS receiver 36 and the communication I/F 38, respectively. The description of these is omitted.

A display device 60 is a touch panel display that enables the user to input data to the remote operation apparatus 20 by touching the display device 60. If the display device 60 is not the touch panel display, the remote operation apparatus 20 comprises an input device. A speaker 62 outputs a warning sound. A vibration motor 64 is a motor for vibrating the remote operation apparatus 20.

(Outline of Operation)

The vehicle control apparatus 10 executes a remote driving control for automatically driving the vehicle VA in accordance with a command transmitted by the remote operation apparatus 20 when the user outside the vehicle VA operates the remote operation apparatus 20. For example, a smart summon and a reverse summon are known as the remote driving control.

In the smart summon, the vehicle VA automatically drives from a parking space where the vehicle VA parks to the current position of the remote operation apparatus 20 or to a position designated by the user. In the reverse summon, when the user gets out of the vehicle at an entrance of a parking lot, etc., and operates the remote operation apparatus 20, the vehicle VA automatically drives to search for a parking space where the vehicle VA can park. When the vehicle VA finds the parking space, the vehicle VA automatically parks in that parking space.

While the remote driving control is being executed, the user performs a predetermined operation on the remote operation apparatus 20. When the user performs the predetermined operation on the remote operation apparatus 20, the remote operation apparatus 20 transmits the command to the vehicle control apparatus 10. When the vehicle control apparatus 10 receives the command, the vehicle control apparatus 10 automatically drives the vehicle VA. While the vehicle VA is automatically driving, the vehicle control apparatus 10 controls the powertrain actuator 40, the brake actuator 42, and the steering motor 44 so that the vehicle VA drives along a target route to a target position. Furthermore, the vehicle control apparatus 10 recognizes the object based on the image data and the sonar data, and controls the powertrain actuator 40, the brake actuator 42, and the steering motor 44 to avoid the vehicle VA from contacting with the object.

While such remote driving control is being executed, the user needs to monitor the vehicle VA by actually watching the vehicle VA.

While the remote driving control is being executed, the vehicle control apparatus 10 or the remote operation apparatus 20 determines whether or not the user is watching the vehicle VA. If a non-watching condition is satisfied, the remote operation apparatus 20 performs a watching notification to urge the user to watch the vehicle VA. When a non-watching state in which the user does not watch the vehicle VA continues for a predetermined time period or longer, the non-watching condition is satisfied.

If the user is not watching the vehicle VA while the remote driving control is being executed, the watching notification is performed. Therefore, a probability that the user watches the vehicle VA can be increased.

An apparatus that determines whether or not the user is watching the vehicle VA of the vehicle control apparatus 10 and the remote operation apparatus 20 is referred to as a monitoring apparatus. In this embodiment, the monitoring apparatus is the vehicle control apparatus 10.

(Specific Operation)

Figure 2:
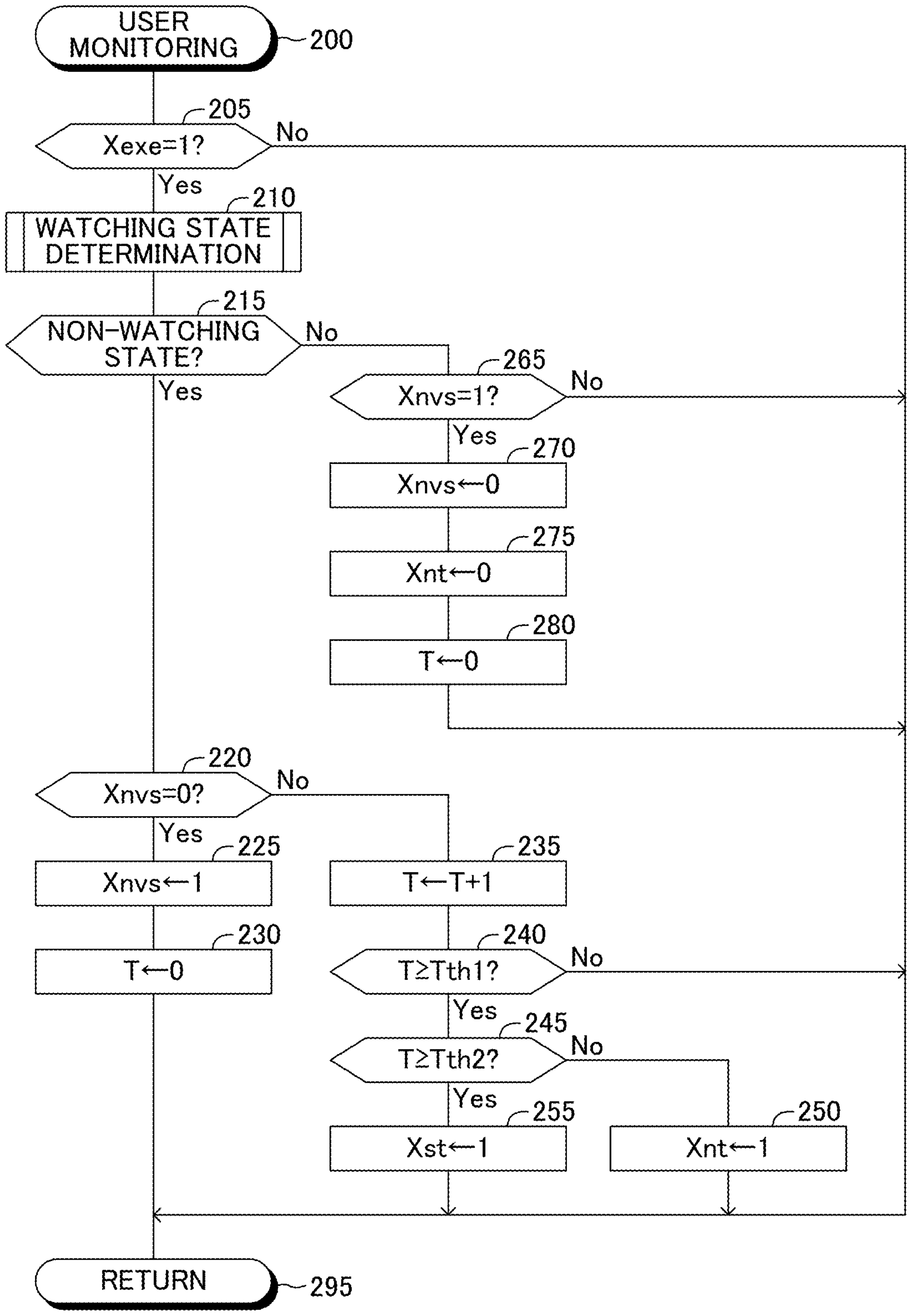
FIG. 2 is a flowchart illustrating a user monitoring routine executed by a CPU of an ECU shown in FIG. 1.
Figure 3:
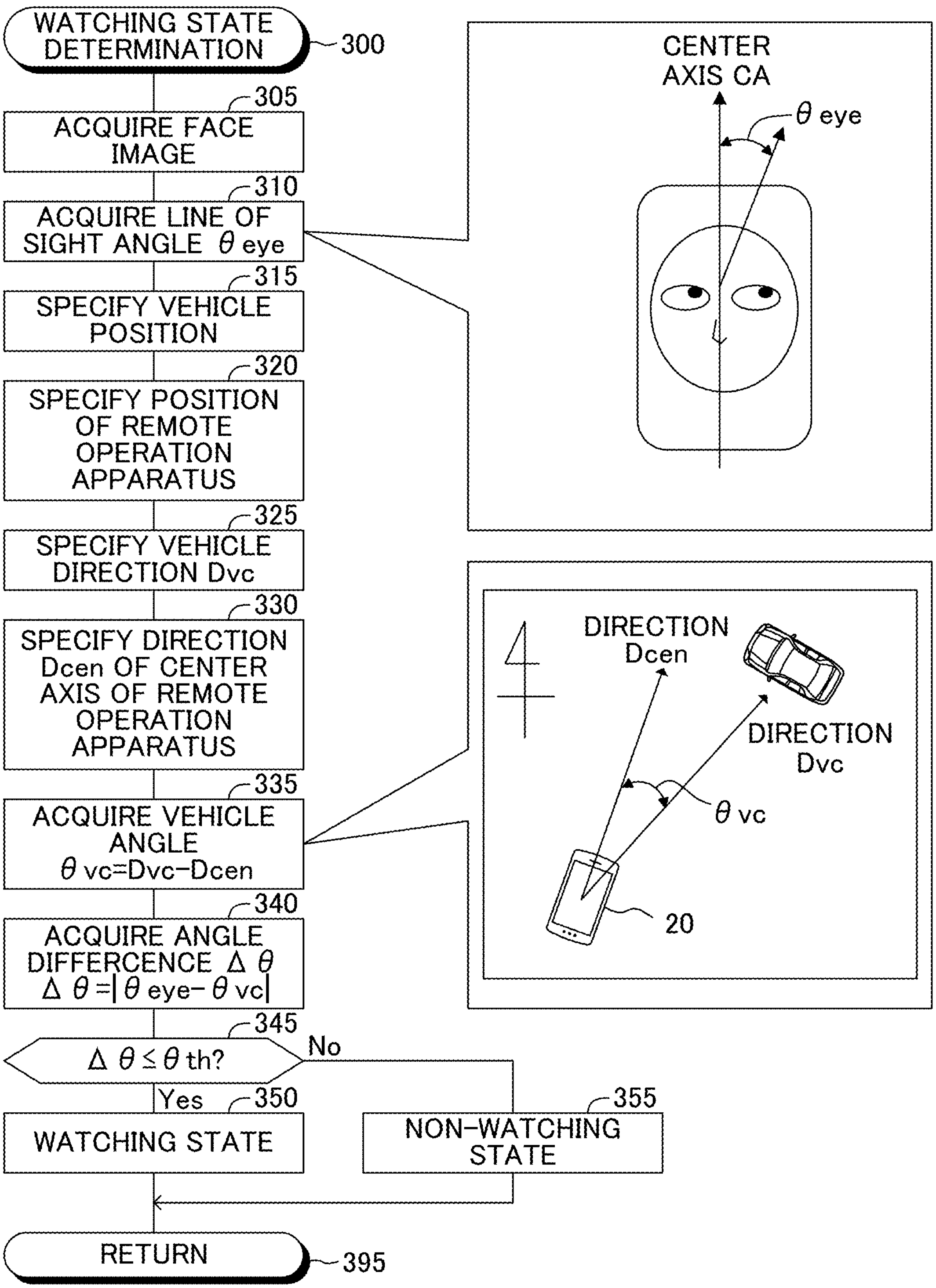
FIG. 3 is a flowchart illustrating a watching state determination subroutine executed by the CPU of the ECU shown in FIG. 1.
Figure 4:
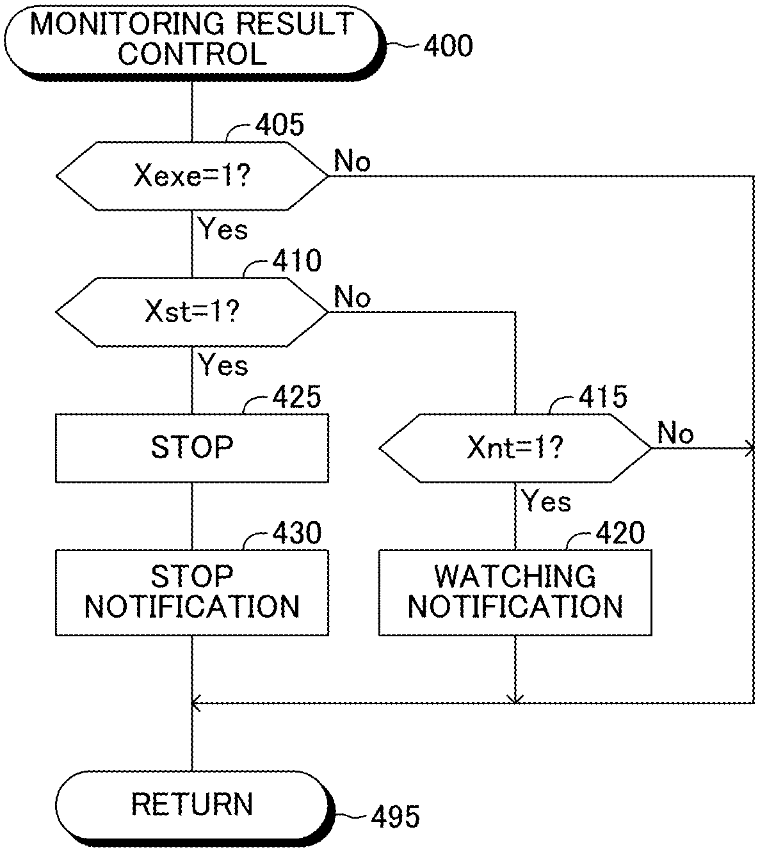
FIG. 4 is a flowchart illustrating a monitoring result control routine executed by the CPU of the ECU shown in FIG. 1.

The CPU of the ECU 30 executes routines shown by flowcharts in FIGS. 2 through 4 every time a predetermined time elapses. Hereinafter, the CPU of the ECU 30 is referred to as a "first CPU".

<User Monitoring Routine>

When an appropriate time point comes, the first CPU starts a process from step 200 in FIG. 2 and the process proceeds to step 205. At step 205, the CPU determines whether or not a value of an execution flag Xexe is "0".

The execution flag Xexe is set to "1" when the remote driving control is started, and is set to "0" when the remote driving control is ended. Furthermore, the execution flag Xexe is set to "0" in an initialization routine. The initialization routine is executed by the first CPU when an ignition key switch (not shown) of the vehicle VA is changed from an off position to an on position.

If the user touches a start button displayed on the remote operation apparatus 20, the remote operation apparatus 20 transmits a start command to the vehicle control apparatus 10. When the first CPU receives the start command, the first CPU starts the remote driving control. The remote driving control ends when the vehicle VA arrives at a space designated by the user, or when the non-watching state continues for a second predetermined time period or longer. The second predetermined time period is longer than a first predetermined time period.

If the execution flag Xexe is "0", the first CPU makes a "No" determination at step 205, and the process proceeds to Step 295. At Step 295, the first CPU terminates the present routine tentatively.

If the execution flag Xexe is "1", the first CPU makes a "Yes" determination at step 205 and executes steps 210 and 215.

Step 210: The first CPU executes a watching state determination subroutine described below. In the watching state determination subroutine, the first CPU determines whether the user is in a watching state where the user is watching the vehicle VA or the non-watching state where the user is not watching the vehicle VA.

Step 215: The first CPU determines whether or not it is determined that the user is in the non-watching state in the watching state determination subroutine.

If it is determined that the user is in the non-watching state in the watching state determination subroutine, the first CPU makes a "Yes" determination at step 215 and the process proceeds to step 220. At step 220, the first CPU determines whether or not a non-watching flag Xnvs is "0". The non-watching flag Xnvs is set to "1" when the user is not watching the vehicle VA, and is set to "0" when the user is watching the vehicle VA. The non-watching flag Xnvs is set to "0" in the initialization routine. Furthermore, when the remote driving control is started, the non-watching flag Xnvs is also set to "0".

If the non-watching flag Xnvs is "0", the first CPU makes a "Yes" determination at step 220 and executes steps 225 and 230.

Step 225: The first CPU sets the non-watching flag Xnvs to "1".

Step 230: The first CPU sets a timer T to "0". The timer T is a timer for counting a time period in which the user is in the non-watching state.

Thereafter, the process proceeds to Step 295, and the first CPU terminates the present routine tentatively.

If the non-watching flag Xnvs is "1" when the process proceeds to step 220, the first CPU makes a "No" determination at step 220 and executes steps 235 and 240.

Step 235: The first CPU adds "1" to the timer T.

Step 240: The first CPU determines whether or not the timer T is equal to or greater than a first threshold Tth1. The first threshold Tth1 is set to a value such that the non-watching state continues for the first predetermined time period when the timer T reaches the first threshold Tth1.

If the timer T is smaller than the first threshold Tth1 (i.e., if the non-watching state does not continue for the first predetermined time period or longer), the first CPU makes a "No" determination at step 240 and the process proceeds to step 295. At step 295, the first CPU terminates the present routine tentatively.

If the timer T is equal to or greater than the first threshold Tth1 (i.e. if the non-watching state continues for the first predetermined time period or longer), the first CPU determines that the non-watching condition is satisfied. In this case, the first CPU makes a "Yes" determination at step 240, and the process proceeds to step 245. At step 245, the first CPU determines whether or not the timer T is equal to or greater than the "second threshold Tth2 which is set to a value greater than the first threshold Tth1". The second threshold Tth2 is set to a value such that the non-watching condition state continues for the second predetermined time period when the timer T reaches the second threshold Tth2.

If timer T is smaller than the second threshold Tth2 (i.e., if the non-watching state does not continue for the second predetermined time period or longer), the first CPU makes a "No" determination at step 245 and the process proceeds to step 250. At step 250, the first CPU sets a notification flag Xnt to "1".

The notification flag Xnt is set to "1" when the remote operation apparatus 20 performs the watching notification, and is set to "0" when the remote operation apparatus 20 does not perform the watching notification. The notification flag Xnt is set to "0" in the initialization routine. Furthermore, the notification flag Xnt is also set to "0" when the remote driving control is started.

If the timer T is equal to or greater than the second threshold Tth2 (i.e., if the non-watching state continues for the second predetermined time or longer), the first CPU makes a "Yes" determination at step 245 and the process proceeds to step 255. At step 255, the first CPU sets a stop flag Xst to "1". The stop flag Xst is set to "1" when the first CPU stops the vehicle VA, and is set to "0" when the first CPU does not stop the vehicle VA. The stop flag Xst is set to "0" in the initialization routine. Furthermore, the stop flag Xst is also set to "0" when the remote driving control is started. Thereafter, the process proceeds to step 295, and the first CPU terminates the present routine tentatively.

If the stop flag Xst is set to "1", the first CPU transmits a stop command to the remote operation apparatus 20. When the remote operation apparatus 20 receives the stop command, the remote operation apparatus 20 displays, on the display device 60, a stop screen including a resume button. When the user operates the resume button, the remote operation apparatus 20 transmits a resume signal. When the first CPU receives the resume signal, the first CPU sets the notification flag Xnt and the stop flag Xst to "0" and resumes the remote driving control.

If it is determined that the user is not in the non-watching state in the watching state determination subroutine when the process proceeds to step 215, the first CPU makes a "No" determination at step 215, and the process proceeds to step 265.

At Step 265, the first CPU determines whether or not the non-watching flag Xnvs is "1". If the non-watching flag Xnvs is "1", the first CPU makes a "Yes" determination at step 265 and executes steps 270 to 280.

Step 270: The first CPU sets the non-watching flag Xnvs to "0".

Step 275: The first CPU sets the notification flag Xnt to "0".

Step 280: The first CPU sets the timer T to "0".

Thereafter, the process proceeds to step 295, and the first CPU terminates the present routine tentatively.

If the non-watching flag Xnvs is "0" when the process proceeds to step 265, the CPU makes a "No" determination at step 265 and the process proceeds to step 295. At step 295, the CPU terminates the present routine tentatively.

<Watching State Determination Subroutine>

When the process proceeds to step 210, the first CPU starts the process from step 300 in FIG. 3, and executes steps 305 to 345.

Step 305: The first CPU acquires the face image captured by the camera 52 of the remote operation apparatus 20.

Step 310: The first CPU acquires a line of sight angle θeye, which represents a direction of a line of sight of the user with respect to the central axis CA of the remote operation apparatus 20, based on the face image. The central axis CA is a virtual line parallel to a longitudinal direction of the remote operation apparatus 20 (the smartphone), which passed through the center of the remote operation apparatus 20.

Step 315: The first CPU specifies the current position of the vehicle VA based on the signals received by the GNSS receiver 36.

Step 320: The first CPU acquires the current position of the remote operation apparatus 20.

Specifically, the CPU (hereinafter referred to as a "second CPU") of the control unit 50 of the remote operation apparatus 20 acquires the current position of the remote operation apparatus 20 based on the signals received by the GNSS receiver 56. The first CPU acquires the current position of the remote operation apparatus 20 from the remote operation apparatus 20.

Step 325: The first CPU specifies a vehicle direction Dvc in which the vehicle VA is located as seen from the remote operation apparatus 20, based on the current position of the vehicle VA and the current position of the remote operation apparatus 20.

The vehicle direction Dvc is a value that increases in a clockwise direction, with north being 0 degrees. If the vehicle VA is located to the east of the remote operation apparatus 20, the vehicle Direction Dvc is 90 degrees. If the vehicle VA is located to the south of the remote operation apparatus 20, the vehicle direction Dvc is 180 degrees. If the vehicle VA is located to the west of the remote operation apparatus 20, the vehicle direction Dvc is 270 degrees.

Step 330: The first CPU specifies a direction Dcen of the center axis CA of the remote operation apparatus 20. The direction Dcen is a value that increases in a clockwise direction, with north being 0 degrees, in the same way as the vehicle direction Dvc.

The second CPU specifies the direction Dcen based on the detection value of the orientation sensor 54. The first CPU acquires the direction Dcen from the remote operation apparatus 20.

Step 335: The first CPU acquires the vehicle angle θvc, which is an angle of "the direction in which the vehicle VA is located with respect to the remote operation apparatus 20" with respect to the central axis CA, by subtracting the direction DcEn from the vehicle direction Dvc.

Step 340: The first CPU acquires, as an angle difference Δθ, a magnitude of a value acquired by subtracting the vehicle angle θvc from the line of sight angle θeye.

Step 345: The first CPU determines whether or not an angle difference Δθ is equal to or smaller than a predetermined threshold Δθth.

If the angle difference Δθ is equal to or smaller than the threshold Δθth, the user is in the watching state. In this case, the first CPU makes a "Yes" determination at step 345, and the process proceeds to step 350. At step 350, the first CPU determines that the user is in the watching state. Thereafter, the process proceeds to step 395 and the first CPU terminates the present routine tentatively.

On the other hand, if the angle difference Δθ is greater than the threshold Δθth, the user is in the non-watching state. In this case, the first CPU makes a "No" determination at step 345, and the process proceeds to step 355. At step 355, the first CPU determines that the user is in the non-watching state. Thereafter, the process proceeds to step 395 and the first CPU terminates the present routine tentatively.

<Monitoring Result Control Routine>

When an appropriate time comes, the first CPU starts a process from step 400 in FIG. 4. At step 405, the first CPU determines whether or not the execution flag Xexe is "1".

If the execution flag Xexe is "0", the first CPU makes a "No" determination at step 405. Thereafter, the process proceeds to step 495, and the first CPU terminates the present routine tentatively.

If the execution flag Xexe is "1", the first CPU makes a "Yes" determination at step 405, and the process proceeds to step 410. At step 410, the first CPU determines whether or not the stop flag Xst is "1".

If the stop flag Xst is "0", the first CPU makes a "No" determination at step 410, and the process proceeds to step 415. At step 415, the first CPU determines whether or not the notification flag Xnt is "1".

If the notification flag Xnt is "0", the first CPU makes a "No" determination at Step 415, and the process proceeds to step 495. At step 495, the first CPU terminates the present routine tentatively.

On the other hand, if the notification flag Xnt is "1", the first CPU makes a "Yes" determination at step 415, and the process proceeds to step 420. At step 420, the first CPU makes the remote operation apparatus 20 perform the watching notification.

In detail, the first CPU transmits a notification command to the remote operation apparatus 20. When the remote operation apparatus 20 receives the notification command, the remote operation apparatus 20 performs the watching notification. In the watching notification, the remote operation apparatus 20 displays a message "Please watch the vehicle." on the display device 60. In addition, in the watching notification, the remote operation apparatus 20 may make the speaker 62 output the above message, or may vibrate itself by activating the vibration motor 64.

Thereafter, the process proceeds to step 495, and the first CPU terminates the present routine tentatively.

If the stop flag Xst is "1" when the process proceeds to step 410, the first CPU makes a "Yes" determination at step 410 and executes steps 425 and 430.

Step 425: The first CPU controls the powertrain actuator 40 and the brake actuator 42 to stop the vehicle VA.

Step 430: The first CPU makes the remote operation apparatus 20 perform a stop notification.

In detail, the first CPU transmits a stop command to the remote operation apparatus 20. The remote operation apparatus 20 displays the stop screen on the display device 60. On the stop screen, the above-mentioned resume button and a message "The vehicle was stopped because you did not watch the vehicle." are displayed.

Thereafter, the process proceeds to step 495, and the first CPU terminates the present routine tentatively.

According to the present embodiment, if the non-watching state continues for the first predetermined time period or longer, the monitoring apparatus (the vehicle control apparatus 10) makes the remote operation apparatus 20 perform the watching notification. As a result, if the user is not watching the vehicle VA while the remote driving control is being executed, the watching notification is performed. Therefore, a possibility that the user watches the vehicle VA can be increased.

Furthermore, if the non-watching state continues for the second predetermined time period, the monitoring apparatus (the vehicle control apparatus 10) stops the vehicle VA. A possibility that the vehicle VA contacts with an obstacle while the user is not watching the vehicle VA can be decreased.

Furthermore, the monitoring apparatus (the vehicle control apparatus 10) acquires the angle difference Δθ, which is the magnitude of the value acquired by subtracting the vehicle angle θvc from "the line of sight angle θeye acquired based on the face image". In other words, the monitoring apparatus (the vehicle control apparatus 10) acquires the angle difference Δθ, which is a magnitude of an angle formed by a direction of the line of sight and "the direction in which the vehicle VA is located as seen from the remote operation apparatus 20". The monitoring apparatus (the vehicle control apparatus 10) determines that the user is in the watching state when the angle difference Δθ is equal to or smaller than the predetermined threshold Δθth. The monitoring apparatus (the vehicle control apparatus 10) determines that the user is in the non-watching state when the angle difference Δθ is greater than the predetermined threshold Δθth. The monitoring apparatus (the vehicle control apparatus 10) can accurately determine whether the user is in the watching state or the non-watching state.

First Modification Example

In a first modification example, the first CPU determines whether the user is in the watching state or the non-watching state using the vehicle angle θvc, without using the line of sight angle θeye. In more detail, the first CPU determines that the user is in the watching state when the magnitude of the vehicle angle θvc is equal to or smaller than a threshold angle θth, and the first CPU determines that the user is in the non-watching state when the magnitude of the vehicle angle θvc is greater than the threshold angle θth. As a result, the remote operation apparatus 20 no longer needs to start the camera 52 to acquire the face image of the user.

Second Modification Example

The monitoring apparatus may be the remote operation apparatus 20. In this case, the second CPU executes the routines shown in FIGS. 2 to 4. If the non-watching state continues for the second predetermined time period or longer, the second CPU transmits the stop command to the vehicle control apparatus 10. If the vehicle control apparatus 10 receives the stop command, the vehicle control apparatus 10 stops the vehicle VA.

Third Modification Example

The line of sight angle θeye and the vehicle angle θvc are acquired relative to the center axis CA, but the line of sight angle θeye and the vehicle angle θvc only need to be acquired relative to a predetermined reference line of the remote operation apparatus 20.

The vehicle control apparatus 10 may be applied to (or installed in/on) an engine vehicle, a hybrid electric vehicle (HEV), a plug-in hybrid electric vehicle (PHEV), a fuel cell electric vehicle (FCEV), and a battery electric vehicle (BEV). The vehicle control apparatus 10 may be applied to (or installed in/on) an automatic driving vehicle.

What is claimed is:

1. A monitoring apparatus configured to monitor a user while a remote driving control for driving a vehicle in accordance with a command from the user outside the vehicle is being executed, wherein, the monitoring apparatus is configured to perform a watching notification for urging the user to watch the vehicle when a non-watching condition is satisfied, the non-watching condition being a condition that is satisfied when a non-watching state in which the user does not watch the vehicle continues for at least a first predetermined time period, wherein, the monitoring apparatus is configured to stop the vehicle when the non-watching state continues for a second predetermined time period which is longer than the first predetermined time period, wherein, the remote driving control is executed in accordance with the command that the remote operation apparatus transmits when the user operates the remote operation apparatus, wherein, the monitoring apparatus is configured to determine that the user is in the non-watching state when a vehicle angle of a vehicle direction with respect to a predetermined reference line of the remote operation apparatus is greater than a predetermined threshold, the vehicle direction being a direction in which the vehicle is located with respect to the remote operation apparatus.

2. The monitoring apparatus according to claim 1, wherein the predetermined reference line is a central axis of the remote operation apparatus, and a direction of the central axis is specified based on a detection value of an orientation sensor of the remote operation apparatus.

3. The monitoring apparatus according to claim 1, wherein, the remote driving control is executed in accordance with the command that the remote operation apparatus transmits when the user operates the remote operation apparatus, wherein, the monitoring apparatus is configured to:

specify a line of sight angle of a line of sight of the user with respect to a predetermined reference line of the remote operation apparatus;

specify a vehicle angle of a vehicle direction with respect to the predetermined reference line, the vehicle direction being a direction in which the vehicle is located with respect to the remote operation apparatus; and determine that the user is in the non-watching state when a magnitude of a difference between the line of sight angle and the vehicle angle is greater than a predetermined threshold.

4. The monitoring apparatus according to claim 1, wherein the monitoring apparatus is configured to specify the vehicle direction based on a current position of the vehicle and a current position of the remote operation apparatus.

5. The monitoring apparatus according to claim 3, wherein, the monitoring apparatus is configured to apply in the remote operation apparatus or the vehicle.

6. The monitoring apparatus according to claim 1, wherein the watching notification includes at least one of: displaying a message on a display device of the remote operation apparatus, outputting a message via a speaker of the remote operation apparatus, or vibrating the remote operation apparatus.

7. The monitoring apparatus according to claim 1, wherein the monitoring apparatus is configured to display a stop screen including a resume button on the remote operation apparatus when the vehicle is stopped, and to resume the remote driving control when the user operates the resume button.

8. The monitoring apparatus according to claim 4, wherein the current position of the vehicle is specified based on signals received by a GNSS receiver of the vehicle, and the current position of the remote operation apparatus is specified based on signals received by a GNSS receiver of the remote operation apparatus.

* * * * *